Sept. 29, 1925.                                                        1,555,268
O. A. COLBY
ELECTRIC AIR HEATER
Filed May 9, 1923
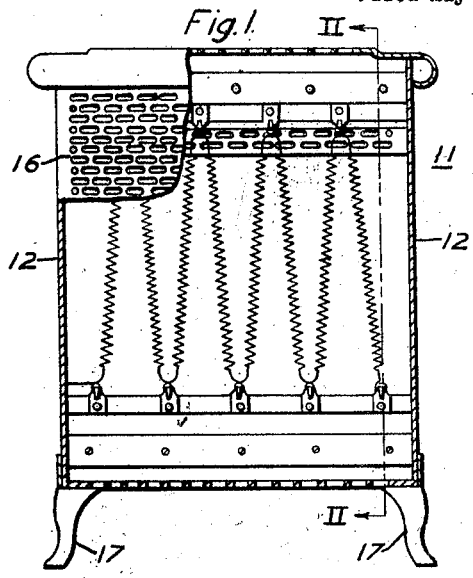
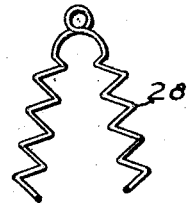
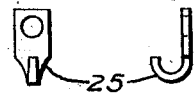
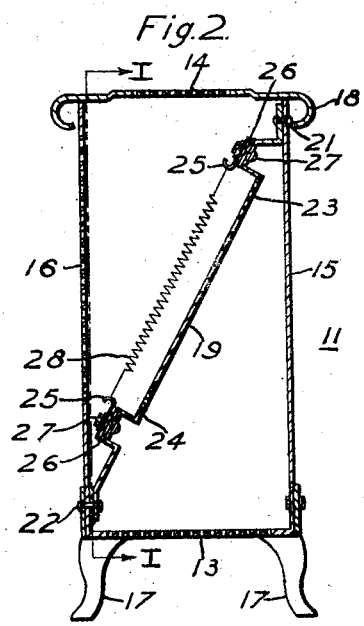
WITNESSES:
Thomas H. English
N. M. Biebel
INVENTOR
Ora A. Colby.
BY
Wesley G. Carr
ATTORNEY Patented Sept. 29, 1925.

1,555,268

UNITED STATES PATENT OFFICE.

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

ELECTRIC AIR HEATER.

Application filed May 9, 1923. Serial No. 637,752.

*To all whom it may concern:*

Be it known that I, ORA A. COLBY, a citizen of the United States, and a resident of Irwin, in the county of Westmoreland and State of Pennsylvania, have invented a new and useful Improvement in Electric Air Heaters, of which the following is a specification.

My invention relates to electric heaters and particularly to electric air heaters.

The object of my invention is to provide a relatively small, inexpensive and easily manufactured and assembled air heater comprising a minimum number of parts.

In practicing my invention, I provide a sheet-metal casing having perforated top, bottom, and front portions. I provide a dished metal reflector having a plurality of perforations therethrough adjacent to the upper and the lower edges and locate it in a diagonal position in the casing. An extended heating element, of substantially zigzag form, is located in front of the metal reflector and is supported by insulated hooks secured to the edges of the reflector.

In the single sheet of drawings—

Figure 1 is a view, in vertical longitudinal section, of an air heater embodying my invention, taken on the line I—I of Fig. 2, a part of the front cover member being illustrated.

Fig. 2 is a view, in vertical lateral section thereof, taken on the line II—II of Fig. 1.

Fig. 3 is a fragmentary view of an electric heating element comprising a part of the device embodying my invention, and Figs. 4 and 5 are views in front and in side elevation, respectively, of a resistor supporting member comprising a part of the device embodying my invention.

An electric air heater 11 comprises a suitable metallic casing having imperforate side portions 12, a perforated bottom portion 13, a perforated top portion 14, an imperforate back portion 15 and a perforated front portion 16. The various portions constituting the casing may be integral or they may be secured to each other in any suitable or desired manner, as is usual in the art.

The casing is provided with a plurality of suitable supporting members 17, of any desired shape and contour to harmonize with the casing. The top portion 14 may, for purposes of easy assembly, be made removable and it is provided with a roll rim 18 extending substantially around the entire periphery thereof to provide an ornamental and pleasing effect. While the casing of the heater 11 may be of any suitable or desired shape in both lateral and longitudinal sections, I have illustrated it as being substantially rectangular in contour in each direction.

A dished metal reflector 19 is located within the casing of the heater and is substantially rectangular in contour if it is to be located in a substantially rectangular casing. The reflector member 19 extends diagonally of the casing from the lower front edge to the upper back edge thereof, substantially as indicated in Fig. 2 of the drawing. The upper and the lower edges of the reflector member 19 are secured, respectively, to the back portion 15 and the front portion 16 by rivets 21 or bolts 22.

If it is desired to employ a construction that will permit of the easy and quick removal of the reflector member 19, I may employ bolts 22 and, if this is not considered necessary or desirable, I employ the rivets 21. A plurality of perforations 23 are provided in the upper portions of the reflector 19 and a plurality of substantially similar perforations 24 are provided adjacent to the bottom portion of the dished part of the reflector.

A plurality of hook members 25 are located in spaced relation on the reflector member 19 immediately adjacent to the top and the bottom edges of the dished portion and are insulated therefrom by suitable plates 26 of insulating material. Bolts 27 may be employed to hold the members 25 in their proper operative position against the dished reflector member 19, substantially as illustrated in the drawings.

A heating element comprises a helically-wound resistor wire 28 that is supported in front of the dished portion of the reflector 19 by extending over, and between, the hook members 25, the wire being looped around the hook members 25 substantially as illustrated in Figs. 1 and 3 of the drawing. The hook members 25 are located in staggered relation relatively to each other on the top and the bottom parts of the reflector 19 whereby the resistor member extends in zigzag convolutions between the upper and the lower hook members and across the front of the reflector.

By providing a casing that is perforated at the bottom, front and top portions, I am able to operate the device as a convection air heater, in part, and, by providing a reflector, I find it possible to obtain the reflection and radiation of a part of the heat that is produced by the resistor member. By providing perforations in the reflector member adjacent to the top and the bottom edges thereof, which permit air to flow past the supporting hooks, it is possible to effect a material reduction in the temperature of the supporting means of the resistor member, thereby insuring a long life to these parts.

By varying the number and extent of the perforations 24 adjacent to the bottom edge of the reflector member, it is possible to vary the amount of heat that is carried away from the resistor member by convection currents of air leaving the heater through the perforated front and the perforated top portions.

By providing a relatively simple and easily manufactured form of metal reflector substantially of the type illustrated in the drawings, it is possible to build an air heater of this type at relatively small expense and still obtain the translation of relatively large amounts of energy into heat, which heat is, in part, radiated directly from the heating element, and is, in part, reflected from the reflector member and is further partly distributed by convection currents of air passing through the heater casing.

Various modifications may be made in the device without departing from the spirit and scope of my invention, and I desire, therefore, that only such limitations shall be placed thereon as are imposed by the prior art or are specifically set forth in the appended claims.

I claim as my invention:

1. In an electric air heater, in combination, a perforated casing, a metal reflector located in said casing, and an open, helically-wound, resistor member extending in zigzag convolutions across the front of the reflector.

2. In an electric heater, in combination, a perforated casing, a dished metal reflector located in said casing, and an open, helically-wound, resistor member extending in zigzag convolutions across the front of said reflector.

3. In an electric heater, in combination, a perforated casing, a dished metal reflector located in said casing, and an open, helically-wound, resistor member extending in zigzag convolutions across the front of said reflector and insulatedly supported by the edge-portions thereof.

4. In an electric heater, in combination, a perforated casing, a dished metal reflector extending diagonally within said casing, and an open, helically-wound, resistor member extending in zigzag convolutions across the front of said reflector and insulatedly supported by the edge-portions thereof.

5. In an electric heater, in combination, a perforated casing, a dished metal reflector extending diagonally within said casing and having ventilating openings adjacent its lower and its upper edges, a plurality of hooks insulatedly mounted on said reflector member adjacent its lower and its upper edges, and an open, helically-wound, resistor member extending in zigzag convolutions across the front of said reflector and supported by said hooks.

6. In an electric heater, in combination, a perforated casing of substantially rectangular shape, a dished metal reflector in said casing extending from the lower front portion to the upper rear portion thereof, a plurality of hooks insulatedly mounted on said reflector member adjacent its lower and upper edges, and an open, helically-wound, resistor member supported by said hooks and extending in front of the dished part of said metal reflector.

In testimony whereof I have hereunto subscribed my name this 7th day of May, 1923.

ORA A. COLBY.